US011146536B2

(12) United States Patent
Beltran et al.

(10) Patent No.: US 11,146,536 B2
(45) Date of Patent: Oct. 12, 2021

(54) METHOD AND A SYSTEM FOR MANAGING USER IDENTITIES FOR USE DURING COMMUNICATION BETWEEN TWO WEB BROWSERS

(71) Applicant: Orange, Paris (FR)

(72) Inventors: Victoria Beltran, Murcia (ES); Emmanuel Bertin, Luc-sur-Mer (FR)

(73) Assignee: ORANGE, Paris (FR)

( * ) Notice: Subject to any disclaimer, the term of this patent is extended or adjusted under 35 U.S.C. 154(b) by 122 days.

(21) Appl. No.: 15/525,573

(22) PCT Filed: Nov. 6, 2015

(86) PCT No.: PCT/FR2015/053005
§ 371 (c)(1),
(2) Date: May 9, 2017

(87) PCT Pub. No.: WO2016/075395
PCT Pub. Date: May 19, 2016

(65) Prior Publication Data
US 2017/0331793 A1 Nov. 16, 2017

(30) Foreign Application Priority Data
Nov. 10, 2014 (FR) ...................................... 1460863

(51) Int. Cl.
*H04L 29/06* (2006.01)
*H04L 29/08* (2006.01)
(52) U.S. Cl.
CPC ........ *H04L 63/0414* (2013.01); *H04L 65/105* (2013.01); *H04L 65/1069* (2013.01);
(Continued)

(58) Field of Classification Search
CPC ............... H04L 63/0414; H04L 65/105; H04L 65/1069; H04L 63/0815; H04L 63/166; H04L 67/02
(Continued)

(56) References Cited

U.S. PATENT DOCUMENTS

| 2013/0103946 A1* | 4/2013 | Binenstock | H04L 63/0492 |
| | | | 713/168 |
| 2014/0095724 A1* | 4/2014 | Yoakum | H04L 29/08054 |
| | | | 709/228 |
| 2014/0280995 A1* | 9/2014 | Ezell | H04L 65/103 |
| | | | 709/229 |

OTHER PUBLICATIONS

International Search Report and Written Opinion dated Feb. 10, 2016 for Application No. PCT/FR2015/053005.
(Continued)

*Primary Examiner* — Evans Desrosiers
(74) *Attorney, Agent, or Firm* — Knobbe, Martens, Olson & Bear, LLP

(57) ABSTRACT

A management method for managing an identity of a first user during communication between a first web browser installed on a communication terminal of the first user and a second web browser installed on a communication terminal of a second user is disclosed. The method includes the first user obtaining at least one first data item characteristic of the second user. The method also includes associating an identity of the first user with the at least one first data item characteristic of the second user. The method also includes making the identity of the first user associated with the at least one first characteristic data item available to the second user on condition that the second user holds at least one second data item corresponding to the first data item characteristic of the second user.

17 Claims, 4 Drawing Sheets

(52) U.S. Cl.
CPC ........ *H04L 63/0815* (2013.01); *H04L 63/166* (2013.01); *H04L 67/02* (2013.01)

(58) Field of Classification Search
USPC ........................................................ 713/171
See application file for complete search history.

(56) References Cited

OTHER PUBLICATIONS

Beltran, et al., User Identity for WebRTC Services: A Matter of Trust, IEEE Internet Computing, vol. 18, No. 6, Nov. 1, 2014, pp. 18-25, XP011562860.

Fischl, et al., Framework for Establishing a Secure Real-time Transport Protocol (SRTP) Security Context Using Datagram Transport Layer Security (DTLS), Internet Engineering Task Force (IETF), ISOC, May 11, 2010, pp. 1-37, XP015070794.

Johnston, et al., Using ZRTP to Secure WebRTC, draft-johnston-rtcweb-zrtp-01, Internet Engineering Task Force (IETF), Standard Working Draft, ISOC, Apr. 3, 2014, 9 Pages, XP015098527.

Li, et al., Who Is Calling Which Page on the Web, IEEE Internet Computing, vol. 18, No. 6, Nov. 1, 2014, pp. 26-33, XP011562871.

Peterson, et al., Enhancements for Authenticated Identity Management in the Session Initiation Protocol (SIP), draft-peterson-sip-identity-01, Network Working Group, Internet Draft, ISOC, Jul. 1, 2002, 30 Pages, XP015004832.

Rescorla, WebRTC Security Architecture, draft-ietf-rtcweb-security-arch-10, Internet Engineering Task Force (IETF), ISOC, Jul. 4, 2014, pp. 1-45, XP015100333.

\* cited by examiner

METHOD AND A SYSTEM FOR MANAGING USER IDENTITIES FOR USE DURING COMMUNICATION BETWEEN TWO WEB BROWSERS

RELATED APPLICATIONS

This application is the U.S. National Phase of Application No. PCT/FR2015/053005 entitled "METHOD AND SYSTEM FOR MANAGING USER IDENTITIES INTENDED TO BE IMPLEMENTED DURING COMMUNICATION BETWEEN TWO WEB BROWSERS." filed Nov. 6, 2015, which designated the United States, and which claims the benefit of French Application No. 1460863 filed Nov. 10, 2014.

BACKGROUND OF THE INVENTION

The invention relates to the general field of telecommunications.

It relates more particularly to the field of telecommunications taking place in real time between two or more web browsers installed on user terminals.

Web real time communication (WebRTC) technology is a mechanism that has been developed jointly by the worldwide web consortium (W3C) and the Internet engineering task force (IETF). It relies on a JavaScript application programming interface (API) that allows real time communication to take place directly between a plurality of browsers (i.e. peer-to-peer communication, without passing via a web server). Such communication may be of any kind, i.e. of audio, video, data, etc. type.

In this context, the users participating in the same communication must be capable beforehand of authenticating themselves with one another in a manner that is certain. For this purpose, the IETF has defined a mechanism for transporting user identities. This mechanism relies on the architecture shown in FIG. 1, and it operates on the following principle.

It is assumed to begin with that two users, Alice and Bob, are each connected via respective secure connections to a WebRTC communications provider (typically a web server).

In order to set up communication with Bob, Alice (also referred to below as the "first" user) uses the web browser of her terminal 2 to identify and to authenticate herself with an identity provider (IdP) 3. The identity provider 3 responds by sending Alice's web browser an identity certificate, or more generally proof authenticating Alice.

Alice's web browser transmits this certificate in a signaling message to the web browser of Bob's terminal 4 (where B is also referred to as the "second" user).

This signaling message passes via the WebRTC communications provider 1.

The identity certificate included in the signaling message then allows Bob to verify and/or obtain Alice's identity from the identity provider 3. By way of example, Alice's identity may be an email address, a telephone number, an Internet protocol (IP) address, etc.

The same principle is applied to enable Alice to verify and/or obtain Bob's identity from an identity provider 5 (which may be the same as the identity provider 3).

In order to perform this general mechanism, the IETF has collaborated with the W3C to define and standardize three major aspects:

- the precise information contained in the signaling message that needs to be "cryptographically" associated with the identity of the first user, and a mechanism enabling the messages that are exchanged (in compliance with the JavaScript session establishment protocol) (JSEP) for WebRTC) to carry the identity certificates;
- the interface for the identity providers; and
- the interface (JavaScript for WebRTC) that the API downloaded by the web browser of the first user can use in order to ask the identity provider to generate certificates and to verify them.

The first two aspects are defined in the IETF specification document entitled "WebRTC security architecture—draft-ietf-rtcweb-security-arch-10", Jul. 4, 2014, which is available at the Internet site http://tools.ietf.org/id/draft-ietf-rtcweb-security-arch-10.html. The third aspect is defined by the W3C in the WebRTC API specification document entitled "WebRTC 1.0: real-time communication between browsers", Jun. 17, 2014, and available at the Internet site http://dev.w3.org/2011/webrtc/editor/archives/20140617/webrtc.html.

In the WebRTC context, two categories of unique authentication protocols (or single sign-on (SSO) protocols) are presently envisaged to enable identities to be exchanged between the users participating in communication, namely:

- a first category of protocols that relies on a pre-authorization mechanism: the first user (Alice) receives from her identity provider an authorization code that she sends to the second user (Bob). Bob uses this authorization code to access Alice's identity from his identity provider; and
- a second category of protocols relying on immediate provision of the identity of the user: the identity provider of the first user, Alice, transmits her identity certificate, which she sends to the second user Bob, together with the corresponding identity.

More particularly, the IETF has under consideration an OAuth2.0 protocol for the first category of protocols and a BrowserID protocol for the second category of protocols.

FIG. 2 is a diagram showing how the IETF presently envisages applying the OAuth2.0 protocol in the WebRTC context. For simplification purposes, the same references are used as in FIG. 1, and only Alice's identity provider 3 is shown.

According to the adaptation of the OAuth2.0 protocol envisaged by the IETF, when Alice desires to call Bob via the web browser of her terminal 2, she authenticates herself initially with her own identity provider 3 in conventional manner (e.g. with a login and a password, or a fingerprint, etc.) (step E10). Furthermore, during this step E10, her terminal 2 sends a digital fingerprint to the identity provider 3. This fingerprint is digital information uniquely identifying the call between Alice and Bob, e.g. such as a portion of the pair of asymmetric keys used by Alice for communicating during this call with Bob in a peer-to-peer connection, etc.

The identity provider 3 authenticates Alice and where appropriate, in response to this authentication, provides an authorization code (or "ticket") to Alice's web browser (step E20). This authorization code is proof that Alice has been authenticated by the identity provider IdPA.

Alice's web browser includes the authorization code received from the identity provider 3 together with her fingerprint in her request for a call to the web browser of Bob's terminal 4 (step E30). This call request passes via the web server 1 of the WebRTC communications provider (step E40).

On receiving the call request from Alice, Bob's web browser sends the authorization code included in the call request to Alice's identity provider 3 (step E50). In return it receives an access token (step E60) enabling it to access Alice's identity and her fingerprint from the identity provider 3 (step E70).

Thus, in that approach proposed by the IETF, the authorization code is sent "in the clear" by Alice in the signaling message to Bob. In addition, as mentioned above, the signaling message passes via the web server of the communications provider 1. As a result, a third party (possibly the WebRTC communications provider itself) can with little difficulty intercept the authorization code transmitted by Alice to Bob and use it with Alice's identity provider 3 in order to obtain her identity. Alice's identity provider has no means of verifying that the person using the authorization code has indeed been authorized to do so by Alice (i.e. that authorization has been delegated by Alice). It should be observed that in addition to the resulting security problems, this goes against the philosophy of the OAuth2.0 protocol, which requires that the entity requesting an authorization code should be the same as the entity requesting an access token by using the authorization code.

Similar problems arise when using the BrowserID protocol. Alice sends her identity to Bob in the clear via a non-secure connection with Bob, even before being sure that no "man-in-the-middle" attack might not be compromising her communication with Bob (in other words prior to the verification that makes it possible to set up a secure peer-to-peer connection with Bob). Any malicious third party between Alice and Bob (including potentially the WebRTC communications provider) could thus obtain Alice's identity.

Thus, whatever protocol is envisaged, the IETF proposal does not presently make it possible to guarantee that Alice's (respectively Bob's) identity is received only by the person who has been authorized by Alice (respectively Bob) to receive it, namely Bob.

There therefore exists a need for a mechanism that makes it possible to guarantee that the identities of the users can be exchanged in secure manner for the purpose of communicating between web browsers, and in particular to do so in the WebRTC context.

OBJECT AND SUMMARY OF THE INVENTION

The invention satisfies this need in particular by providing a management method for managing an identity of a first user, which method is for use during communication between a first web browser installed on a terminal of the first user and a second web browser installed on a terminal of a second user, the management method comprising:
    an obtaining step of the first user obtaining at least one first data item characteristic of the second user;
    an association step for associating an identity of the first user with said at least one first data item characteristic of the second user; and
    a making-available step of making the identity of the first user associated with said at least one first characteristic data item available to the second user on condition that the second user holds at least one second data item corresponding to the first data item characteristic of the second user.

The first user's identity may be of various kinds. For example, it may be an email address, a telephone number, etc., or more generally any type of information enabling the second user to identify the other party during the communication, i.e. Alice.

Correspondingly, the invention also provides a system for managing an identity of a first user, the system comprising a plurality of modules activated during communication between a first web browser installed on a terminal of the first user and a second web browser installed on a terminal of a second user, said plurality of modules comprising:
    a module in the terminal of the first user for obtaining at least one first data item characteristic of the second user;
    a module for associating an identity of the first user with said at least one first data item characteristic of the second user; and
    a module for making the identity of the first user associated with said at least one first characteristic data item available to the second user on condition that the second user holds at least one second data item corresponding to the first data item characteristic of the second user.

This management system of the invention may be incorporated in a single device (typically in the terminal of the first user), or its modules may be spread over a plurality of distinct devices (e.g. the first terminal and a trusted entity such as an identity provider of the first user), as described in greater detail below.

It should be observed that no limitation is associated with the time at which the management method of the invention is performed during communication between the web browsers. Thus, the various steps constituting the method may be performed before peer-to-peer communication properly speaking between the users of the browsers, or it may be performed at various times during the communication (certain steps beforehand and others during the communication proper).

Furthermore, although the invention is described as enabling the identity of a user (the "first" user in the meaning of the invention) to be managed, it naturally applies to all of the users participating in the communication, i.e. each user (e.g. Alice or Bob) is considered as being a "first" user in the meaning of the invention.

Furthermore, no limitation is associated with the number of users participating in the communication by using web browsers on their terminals. Thus, if more than two users are participating in the communication, the management method of the invention is performed between each of the users participating in the communication.

Advantageously, the invention enables the first user (e.g. Alice) to associate his or her own identity with a data item characterizing the second user (e.g. Bob), thereby authorizing the second user to receive the identity of the first user. The term "data item characteristic of the second user" is used in the meaning of the invention to designate a data item that is associated with the second user or that identifies the second user uniquely and/or unambiguously. In particular, it may comprise a public encryption key from a pair of asymmetric keys comprising the public key and a secret key allocated to the second user, or a fingerprint of such a key. It should be observed that the pair of keys may be allocated to a given communication (typically it may be a key pair allocated to the second user for a peer-to-peer communication with the first user), and it may vary from one communication to another.

Nevertheless, no limitation is associated with the nature of the characteristic data item used by the invention, providing it makes it possible to characterize the second user unambiguously in order to be sure that the second user is indeed authorized by the first user to access his or her identity.

In a variant implementation, the identity of the first user may also be associated with an identifier of the communication, or with any other parameter associated with the current communication between the first and second users.

By means of the invention, and more particularly by associating the identity of the first user with the data item characteristic of the second user, the first user can be sure that his or her identity is being communicated only with a chosen user who can prove that he or she is indeed authorized by the first user to access the first user's identity. This proof is provided once the second user can demonstrate that he or she holds a data item corresponding to the characteristic data item associated with the identity of the first user, i.e. identical to the characteristic data item or unambiguously associated therewith. For example, when the data item characteristic of the second user associated with the identity of the first user is a public key of a pair of asymmetric keys, the data item corresponding to the characteristic data item may be the private key of the pair of asymmetric keys or it may be a fingerprint of that key.

Consequently, the invention provides a mechanism making it possible to guarantee secure exchange between the users participating in a given communication in a WebRTC context, and by extension, for rendering various telecommunication services associated with presenting user identity during communication, such as calling line identity restriction (CLIR).

The mechanism proposed by the invention is more secure than that presently provided by the IETF, in particular in that it prevents a third party interposed between the first user and the second user (e.g. the WebRTC communication provider to which the first and second users are both connected) from capturing the identity of the first user without the first user's authorization.

Furthermore, the mechanism makes it easy for the first user to select the identity he or she accepts to reveal to the second user. Thus, in a particular implementation of the invention, which particular identity of the first user that is made available to the second user may depend on that second user. In other words, the first user can personalize the identity to be associated with each "second" user, as a function of various criteria (already among contacts, first communication with that user, etc.).

The invention applies advantageously to both types of SSO protocol presently envisaged by the IETF in the WebRTC context, i.e. it applies equally well to the protocols that include pre-authorization (such as the OAuth2.0 protocol) and to protocols involving immediate identity provision (e.g. BrowserID) as described above.

More precisely, in an implementation in which consideration is given to a protocol implementing a pre-authorization mechanism, the obtaining step may be performed by the first browser and the association and making-available steps may be implemented by a trusted entity.

Thus, in this implementation, the identity of the first user is registered in a trusted entity in association with a data item characteristic of the second user authorized by the first user, which trusted entity, by way of example, has already authenticated the first user or is capable of identifying the first user. The trusted entity is typically the first user's identity provider, which generates a code or a ticket for authorizing the first user in the context of the OAuth2.0 protocol.

This implementation thus provides a mechanism that enables the authorization ticket issued by the identity provider of one web browser to be "delegated" to the other, i.e., in other words, it allows the authorization code to be transmitted with the authorization of the first user from the first user's web browser to the other party's web browser. The invention thus makes it easy for the identity provider to verify that the second user has indeed been authorized by the first user to use the authorization code with the identity provider that actually gave the code to the first user, and that the second user is indeed authorized to obtain the identity of the first user.

In a variant of this implementation, said at least one first data item characteristic of the second user is a public key of a public and secret key pair allocated to the second user, said at least one first characteristic data item being obtained by the first browser from the second browser. The step of making the identity of the first user available to the second user may then comprise the trusted entity sending the identity of the first user to the second browser once the trusted entity has received proof of the first user's authentication signed by the second browser using the private key of the key pair allocated to the second user.

Such proof of authentication may be constituted in particular by an authorization code provided by the trusted entity to the first user, which is then signed by using the private key of the second user.

The trusted entity can thus easily verify that the authorization code comes from a user who has been authorized by the first user, by verifying the received signature by using the second user's public key associated with the identity of the first user. This enables the trusted entity to confirm that the second user who sent to it the authorization code does indeed hold a data item corresponding to the characteristic data item as transmitted to the second user by the first user, and has indeed been registered by the trusted entity in association with the first user's identity.

Since the identity of the first user is provided by the trusted entity to the second user only when appropriate, it can readily be understood that it is impossible for a third party between the first and second users to access the identity of the first user without being authorized to do so by the first user.

The invention thus makes it possible to improve the security of SSO protocols with a pre-authorization mechanism, such as the OAuth2.0 protocol.

As mentioned above, the invention is not limited to protocols of this type and can be applied equally well when an SSO protocol with immediate identity provision is envisaged.

Thus, in another implementation relying on using such a protocol, the obtaining, association, and making-available steps are preferably performed by the first browser.

Thus, in this implementation, the first user's identity is registered within the first browser in association with a data item characteristic of the second user as authorized by the first user. Furthermore, it is the first browser that makes the identity of the first user available to the second user as soon as it holds data corresponding to the characteristic data item associated by the first browser with the identity of the first terminal.

This implementation thus provides a mechanism that makes it possible to ensure that the identity of the first user is delivered only to a second user who has been authorized by the first user. It should be observed that in the present example for mechanisms with immediate identity provision, the identity of the first user should be understood as information that identifies the first user in unique manner.

In a variant implementation, said at least one first data item characteristic of the second user is a public key of a public and secret key pair allocated to the second user, said at least one first characteristic data item being obtained by the first browser from a trusted entity that has authenticated the second user.

Furthermore:
- the association step may comprise the first browser encrypting the identity of the first user while using the public key of the second user; and
- the making-available step may comprise the browser sending the identity as encrypted in this way to the second browser.

This makes it possible to guarantee that a third party lying between the first and second users cannot discover the identity of the first user (or of the second user). Specifically, by associating the identity of the first user with the public key of the second user, the first user is ensured that his or her identity is communicated only to the second user, who alone possesses the private key enabling the identity of the first user to be decoded.

Thus, in this variant implementation, making the identity of the first user available does indeed depend on holding a data item corresponding to the public key that has been associated with the identity of the first user, since the second user cannot access the identity of the first user without holding the private key corresponding to that public key. The mere fact of encrypting the identity of the first user with the public key of the second user who has been authorized by the first user ensures that only the second user can access that identity, thereby avoiding any undesired interception of the identity of the first user.

The invention thus also makes it possible to improve the security of SSO protocols with immediate identity provision, such as the BrowserID protocol.

In the implementation adapted to SSO protocols with a pre-authorization mechanism, the management method of the invention relies, as mentioned above, on various entities, and in particular on the terminal of the first user, on the terminal of the second user, and on the trusted entity.

Thus, in another aspect, the invention also provides a terminal of a first user fitted with a first web browser and with a plurality of modules that are activated during communication between the first web browser and a second web browser installed on a terminal of a second user, this plurality of modules being controlled by the first web browser and comprising:
- a module for obtaining at least one first data item characteristic of the second user from the second web browser; and
- a module for communication with a trusted entity to associate an identity of the first user in the trusted entity with said at least one first data item characteristic of the second user.

Correspondingly, the invention also provides a communications method for communication between a first web browser installed on a terminal of a first user and a trusted entity for use during communication between the first web browser and a second web browser installed on a terminal of a second user, the communications method comprising:
- an obtaining step of the first web browser obtaining at least one first data item characteristic of the second user from the second web browser; and
- a communication step of the first web browser communicating with the trusted entity to associate, in the trusted entity, an identity of the first user with said at least one data item characteristic of the second user.

The identity of the first user that is associated with said at least one first data item characteristic of the second user in the trusted entity may be identical to or distinct from an identity of the first user as used during authentication of the first user, which authentication may be performed by the trusted entity.

This makes it possible in particular to personalize the identities that are provided to the correspondents of the first user.

The invention also provides a trusted entity comprising a plurality of modules activated during communication between a first web browser installed on a terminal of the first user and a second web browser installed on a terminal of a second user, this plurality of modules comprising:
- a module for associating an identity of the first user with at least one first data item characteristic of the second user; and
- a module that is activated on the trusted entity receiving proof that the second user holds at least one second data item corresponding to the first data item characteristic of the second user and that is configured to make available to the second user, the identity of the first user associated with said at least one first data item characteristic of the second user.

Correspondingly, the invention also relates to a making-available method of a trusted entity making available an identity of a first user, which method is for use during communication between a first web browser installed on a terminal of the first user and a second web browser installed on a terminal of a second user, the making-available method comprising:
- an association step of the trusted entity associating an identity of the first user with at least one first data item characteristic of the second user; and
- after the trusted entity has received proof that the second user holds at least one second data item corresponding to the first data item characteristic of the second user, a step of making available to the second user the identity of the first user associated with said at least one first data item characteristic of the second user.

This method may in particular follow authentication of the first user by the trusted entity.

The invention also provides a terminal (i.e. the terminal of the second user) suitable for obtaining an identity of a first user during communication between a first web browser installed on a terminal of the first user and a second web browser installed on said terminal, said terminal including a plurality of modules controlled by the second web browser and comprising:
- a module for providing the first browser with at least one first data item characteristic of a second user;
- a module of providing a trusted entity with proof that the second user holds at least one second data item corresponding to the first data item characteristic of the second user; and
- a module for receiving from the trusted entity an identity of the first user as associated in the trusted entity with the first data item characteristic of the second user.

Correspondingly, the invention also provides a method of obtaining an identity of a first user, which method is for use during communication between a first web browser installed on a terminal of the first user and a second web browser installed on a terminal of a second user, the method comprising:
- a step of the second browser providing the first browser with at least one first data item characteristic of the second user;
- a step of the second browser providing a trusted entity with proof that the second user holds at least one second data item corresponding to the first data item characteristic of the second user; and
- a step of the second browser receiving an identity of the first user from the trusted entity, the identity of the first user being associated in the trusted entity with the first data item characteristic of the second user.

The above-specified characteristics of the terminal of the first user and of the terminal of the second user are described with reference to providing the identity of the first user to the second user. Nevertheless, in order to organize secure communication between the first and second users, similar characteristics should preferably be present on the terminals of both users in order to enable the identity of the second user to be provided in secure manner to the first user (or in equivalent manner, to enable the roles of the first and second users to be interchanged).

The various above-mentioned entities (namely in the terminology of the invention, the terminal of the first user, the trusted entity, and the terminal of the second user) form a communications system enabling the first and second users to exchange their identities in secure manner during communication via their web browsers.

The invention thus also provides a communications system comprising:
- a first user's terminal in accordance with the invention having installed thereon a first web browser and as mentioned above;
- a second user's terminal in accordance with the invention having installed thereon a second web browser and as mentioned above; and
- a trusted entity in accordance with the invention and as mentioned above.

The terminal to the first user and communications method performed by that terminal, the trusted entity, and the making-available method performed by that trusted entity, the terminal of the second user and the obtaining method performed by that terminal, and the communications system of the invention all benefit from the same above-mentioned advantages as the management system and the management method of the invention when they are used in the context of protocols with a pre-authorization mechanism.

In an embodiment adapted to SSO protocols with an immediate identity provision mechanism, the management system of the invention is incorporated in the terminal of the first user.

Thus, in another aspect, the invention also provides a terminal including a management system of the invention (terminal of the first user).

The invention thus provides a communications system comprising:
- a first user's terminal having installed thereon a first web browser and including a management system of the invention; and
- a second user's terminal having installed thereon a second web browser and suitable for accessing an identity of the first user as made available by the first user's terminal.

The terminal and the communications system in this embodiment of the invention also benefit from the same above-mentioned advantages as the management system and the management method of the invention when they are used in the context of protocols with immediate identity provision.

In a particular implementation, the various steps of the management and/or obtaining and/or communication and/or making-available methods are determined by computer program instructions.

Consequently, the invention also provides a computer program on a data medium, the program being suitable for being performed in a terminal, a trusted entity, a management system, or more generally in a computer, the program including instructions adapted to perform the steps of a method as described above.

The program may use any programming language, and be in the form of source code, object code, or code intermediate between source code and object code, such as in a partially compiled form, or in any other desirable form.

The invention also provides a computer-readable data or recording medium including instructions of a computer program as mentioned above.

The data medium may be an entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other implementations, it is also possible to envisage that the obtaining, management, making-available, and communications methods, and the terminals, the trusted entity, the management system, and the communications systems of the invention present in combination some or all of the above-specified characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

The invention is described below in the context of communications relying on the WebRTC technology and architecture as developed by the W3C and by the IETF. Nevertheless, this assumption is not limiting, and the invention may rely on other systems for communication between web browsers, such as for example proprietary communications systems.

Furthermore, in the description below, for simplification purposes, the description is limited to communication between two users, Alice and Bob. Nevertheless, the invention applies equally well to communications in which a greater number of users participate.

As mentioned above, the invention proposes a secure mechanism for exchanging identities between users participating in the same communication, and suitable for use equally well in association with an SSO protocol with pre-authorization or with an SSO protocol with immediate identity provision.

Figure 1:
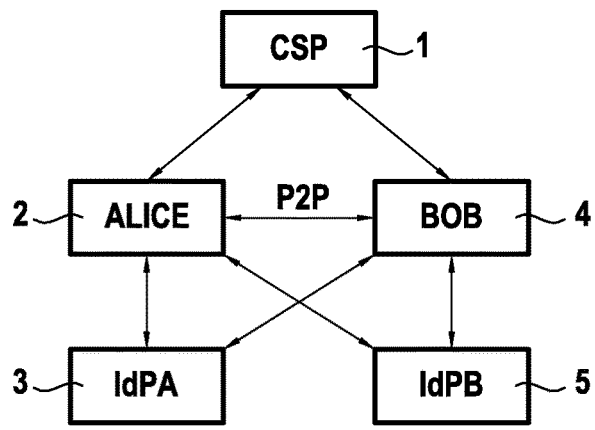
FIG. 1, described above, is a diagram showing the security architecture on which WebRTC technology relies.
Figure 2:
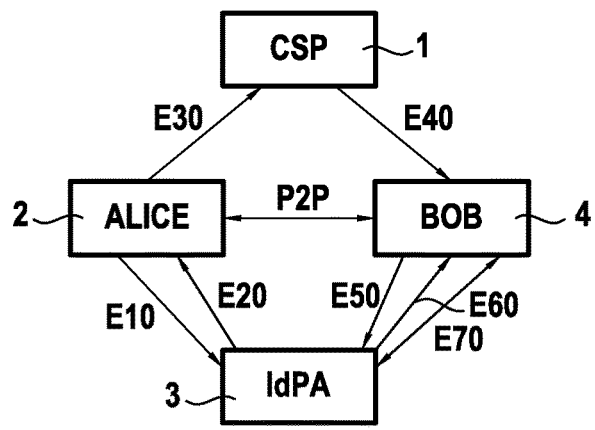
FIG. 2, described above, is a diagram showing the implementation of an SSO mechanism with pre-authorization, as envisaged in the prior art in the WebRTC context.
Figure 3:
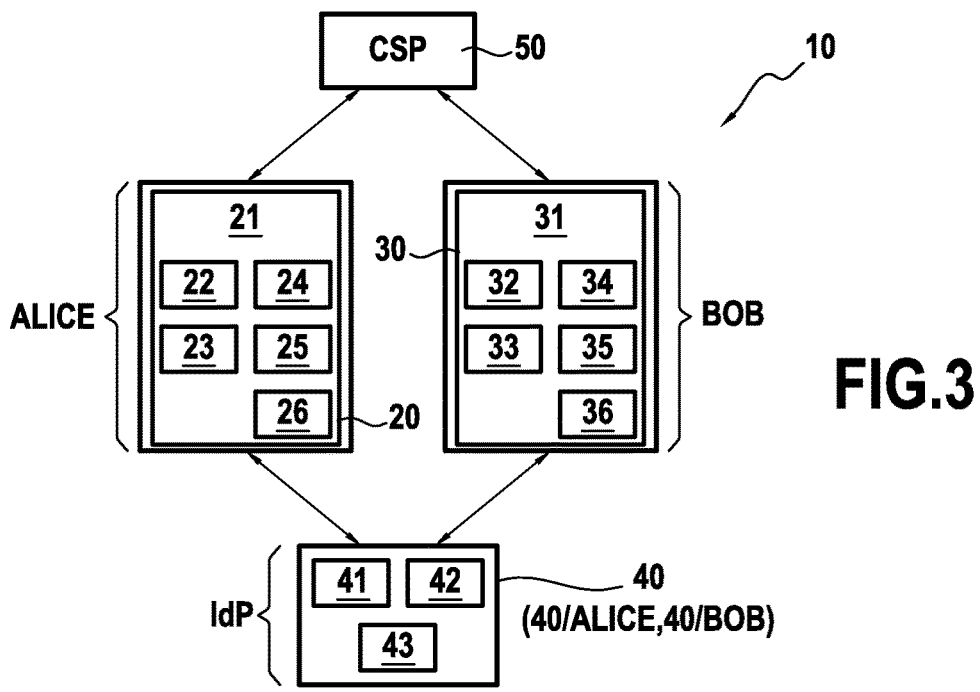
FIG. 3 shows a communications system in accordance with the invention in a first embodiment.

FIG. 3 shows a first embodiment of a communications system 10 in accordance with the invention in its environment, in which the invention is used in association with an SSO protocol based on a pre-authorization mechanism. In the presently-envisaged example, the SSO protocol is the known OAuth2.0 protocol.

In accordance with the invention, in this first embodiment, the communications system 10 comprises:
- a terminal 20 in accordance with the invention of a first user (Alice) and having a web browser 21 installed thereon;
- a terminal 30 in accordance with the invention of a second user (Bob) and having a web browser 31 installed thereon; and
- at least one trusted entity 40 in accordance with the invention and suitable in this example for authenticating the users Alice and Bob. By way of example, this trusted entity 40 is an identity provider or IdP. In order to simplify FIG. 3, consideration is given to only one trusted entity 40 that is common to both users Alice and Bob and that is suitable for managing the identities respectively of Alice (40/Alice) and of Bob (40/Bob). Nevertheless, the invention applies equally when Alice and Bob each rely on a distinct trusted entity.

Also in this example, the communications system 10 includes a web browser 50 of a WebRTC communications provider (or communication service provider (CSP)), to which Alice's and Bob's terminals 20 and 30 are connected via respective secure connections, e.g. using a connection set up using the hypertext transfer protocol secure (HTTPS) protocol.

The web browsers 21 and 31 each have a respective WebRTC programming interface or API. In conventional manner, this API comprises a "PeerConnection" media object that enables communications to be managed with other web browsers, and is suitable for instantiating an IdP proxy for interacting and communicating with the trusted entity 40 (in other words, the proxy provides the interface between the web browser and the trusted entity). Such objects implemented in the WebRTC context and using the JavaScript language are themselves known and they are described in detail in the above-mentioned WebRTC API specification.

In the presently-described first embodiment, it is assumed that each terminal 20 and 30 has the same means for making the identity of its own user available to the other user and for receiving the identity of the other user.

Figure 4A:
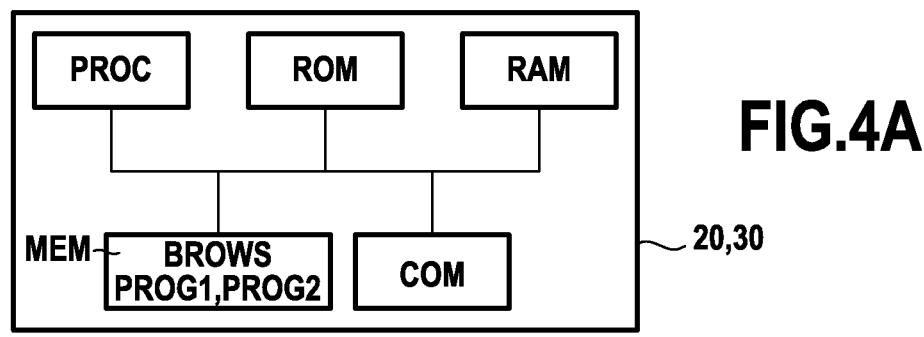
FIGS. 4A and 4B show the hardware architecture respectively of a terminal and of a trusted entity of the invention.

More precisely, in this example, the terminals 20 and 30 have the hardware architecture of a computer, as shown diagrammatically in FIG. 4A.

In particular, each terminal comprises a processor PROC, a read only memory ROM, a random access memory RAM, a non-volatile memory MEM in which the web browser of the terminal is stored (referenced BROWS in FIG. 4A), together with communications means COM for communicating over a telecommunications network NW. No limitation is associated with the nature of the network: it may be a network that is fixed or mobile, wired or wireless, local or not local, etc. These communications means enable the terminals 20 and 30 to communicate with each other, and also with the web server 50 and the trusted entity 40.

The non-volatile memory MEM in each terminal constitutes a storage medium in accordance with the invention that is readable by the process or PROC and that stores one or more computer programs in accordance with the invention, including instructions for executing:
- steps of a communications method of the invention for communicating with the trusted entity 40, and referred to below as the program PROG1; and
- steps of an obtaining method of the invention for obtaining a user identity, and specified below as the program PROG2.

In equivalent manner, the computer program PROG1 defines functional modules of each of the terminals 20 and 30, and more precisely the browsers 21 and 31, and also the interactions between those modules, which modules are actuated during communication in which the browsers of the terminals are participating. No limitation is attached to the type of communication under consideration: it may be communication of audio, video, instant messaging, etc. type, as proposed in particular (but in non-exhaustive manner), by WebRTC technology.

In the first embodiment, the functional modules defined by the computer program PROG1 include in particular for the terminal 20 (and likewise for the terminal 30):
- an obtaining module 22 (or 32) for obtaining at least one data item DB that is characteristic of Bob (or at least one data item DA that is characteristic of Alice); and
- a communications module 23 (respectively 33) for communicating with the trusted entity 40 and suitable for associating therewith the characteristic data DB (respectively DA) with an identity IDA of Alice (respectively with an identity IDB of Bob). No limitation is associated with the nature of the identity: by way of example it may be an email address, a telephone number, etc.

The modules 22 and 23 (or 32 and 33) rely in this example in particular on the communications means COM, on the PeerConnection media object (for the modules 22 and 32), and on the IdP proxy (for the modules 23 and 33) of the terminal 20 (or of the terminal 30).

In similar manner, the computer program PROG2 likewise defines functional modules (together with the interactions between those modules) of each of the terminals 20 and 30, and more precisely the browsers 21 and 31 installed on those terminals, these modules being activated and controlled by the browsers during communication between those browsers.

In the first embodiment and for the terminal 30 (respectively the terminal 20), these functional modules include in particular:
- a module 34 (respectively 24) for providing the browser of the terminal 20 (respectively the terminal 30) with the data item DB characteristic of Bob (respectively the data item DA characteristic of Alice);
- a module 35 (respectively 25) for providing the trusted entity 40 with proof that Bob (respectively Alice) detains at least corresponding one data item associated with the data item DB (respectively with the data item DA); and
- a receiver module 36 (respectively 26) suitable for receiving Alice's identity IDA (respectively Bob's identity IDB) from the trusted entity 40.

These modules rely in particular on the communications means COM of the terminal 30 (or of the terminal 20).

The functions of the functional modules 22-26 and 32-36 of the terminals 20 and 30, respectively, are described in greater detail below with reference to FIG. 5.

Figure 4B:
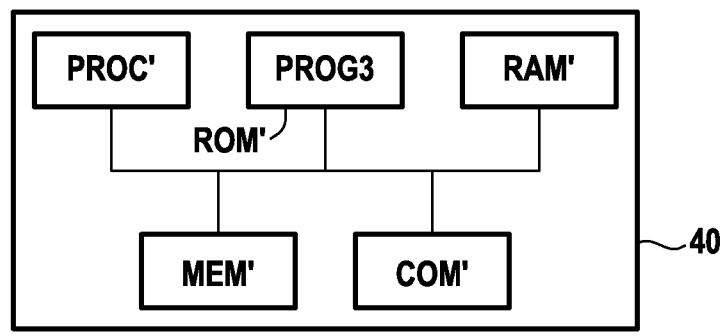

In the presently-described first embodiment, the trusted entity 40 also has the hardware architecture of a computer, as shown diagrammatically in FIG. 4B.

In particular, it comprises a processor PROC', a read only memory ROM', a random access memory RAM', a non-volatile memory MEM', and communications means COM' for communicating on the telecommunications network NW. These communications means enable the trusted entity 40 to communicate in particular with the terminals 20 and 30, and more particularly with the browsers 21 and 31 installed on these terminals.

The read only memory ROM' of the trusted entity 40 constitutes a recording medium in accordance with the invention that is readable by the processor PROC' and that records a computer program PROG3 in accordance with the invention, including instructions for executing steps of a method of the invention for making user identities available.

In equivalent manner, the computer program PROG3 defines functional modules of the trusted entity 40 together with the interactions between those modules, these modules being activated during communication in which the browsers 21 and 31 of the respective terminals 20 and 30 are participating.

In the first embodiment, the functional modules defined by the computer program PROG3 include in particular:

- an authentication module 41 for authenticating users participating in the communication (specifically Alice and Bob in the presently-described example);
- an association module 42 for associating user identities with data characteristic of other users; and
- a module 43 for making available user identities, which module is activated under certain conditions.

The functions of the functional modules 41 to 43 are described in greater detail below with reference to FIG. 5.

Figure 5:
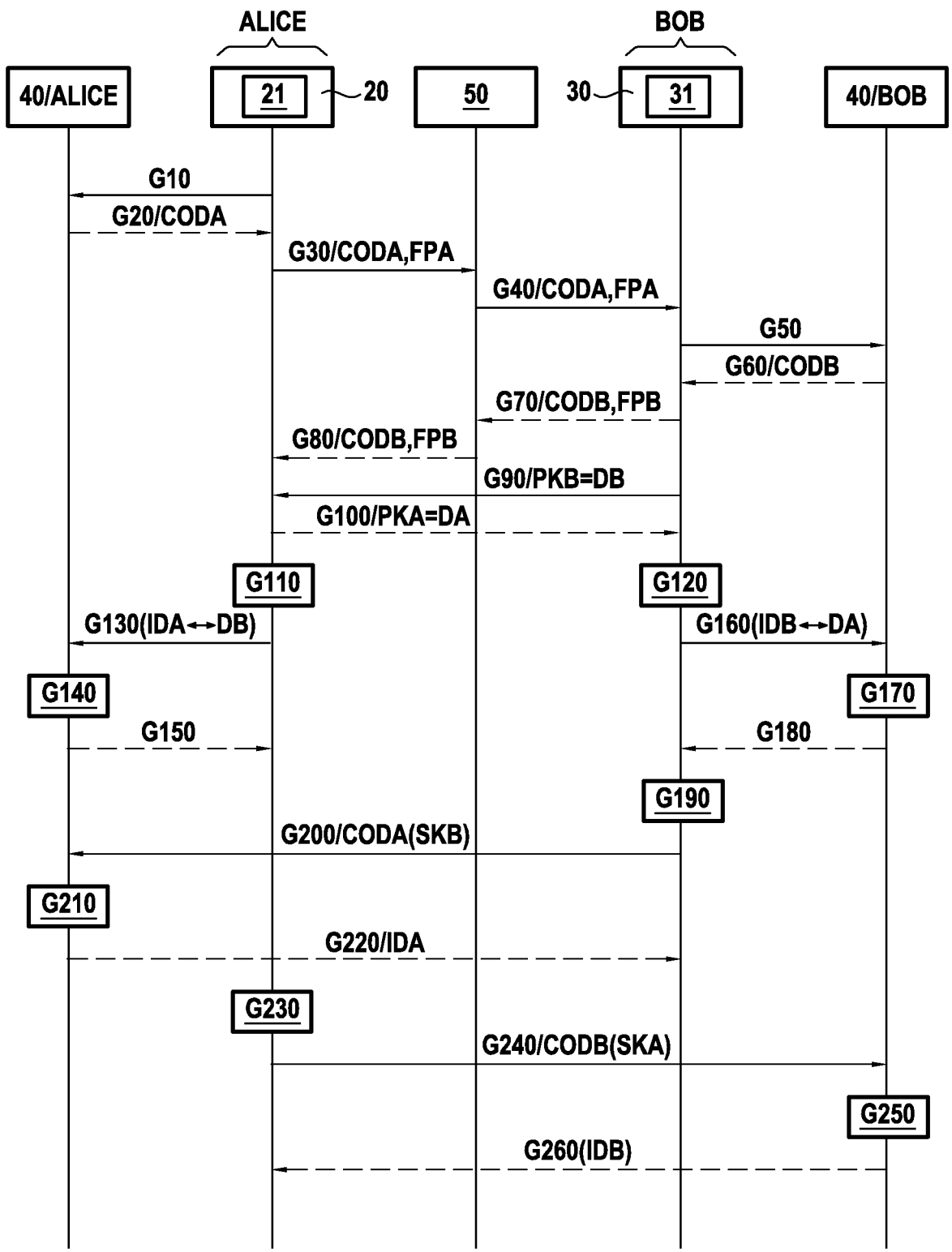
FIG. 5 shows the main steps of a management method, a communications method, and an obtaining method of the invention as performed by the FIG. 3 communications system in the first embodiment.

FIG. 5 is a diagram showing the main steps of the management, making-available, and obtaining methods of the invention in the first embodiment when they are performed by the various entities forming the communications system 10, namely the terminals 20 and 30 and the trusted entity 40, and when the system makes use of the OAuth2.0 authentication protocol.

It should be observed that in this first implementation, the steps of the management method are distributed over a plurality of entities, namely both of the terminals 20 and 30 and also the trusted entity 40. The modules of these entities performing the steps of the management method thus form a management system in the meaning of the invention.

It is assumed that Alice is seeking to use the browser 21 installed on her terminal 20 to set up communication with Bob, or more precisely with the browser 31 installed on Bob's terminal 30. Alice and Bob perform in turn the roles of the first user and of the second user in the meaning of the invention.

For this purpose, and beforehand, the browser 21 sends a request to authenticate Alice to her identity provider (step G10), in other words in this example, to the trusted entity 40 (referenced for greater clarity in FIG. 5 as 40/Alice when it is managing Alice's identity, and as 40/Bob when it is managing Bob's identity). Alice is authenticated by the identity provider 40/Alice (and more particularly its authentication module 41) in conventional manner, as described in the WebRTC architecture and on the basis of the OAuth2.0 protocol.

In response to this authentication request, the browser 21 receives an authorization code CODA from the identity provider 40/Alice (step G20). This authorization code itself constitutes proof that Alice has been authenticated by the trusted entity 40.

The browser 21 sends the authorization code CODA in a signaling message (e.g. a call request) to Bob's browser 31 via the web server 50 (step G30). In this example, it also includes in the signaling message a digital fingerprint FPA, which constitutes digital information identifying the communication between Alice and Bob in unique manner. By way of example, this fingerprint may be constituted by a hash of a public key PKA of a pair of asymmetric keys allocated to Alice for the communication with Bob in order to set up secure peer-to-peer exchanges with Bob using the DTLS protocol. This pair of keys comprises the public key PKA and the associated private or "secret" key SKA. It is generated by Alice's browser 21 for the communication under consideration.

The signaling message containing the authorization code CODA and Alice's fingerprint FPA is routed by the web server 50 to Bob's browser 31 (step G40).

In the presently-described first implementation, on receiving the signaling message from Alice, the browser 31 of Bob's terminal 30 sends a request to authenticate Bob to its identity provider (step G50), in other words in this example to the trusted entity 40/Bob. In return, in compliance with the OAuth2.0 protocol, it obtains an authorization code CODB (step G60). It should be observed that the steps G50 and G60 are not necessarily performed after receiving the call request from Alice, but may be performed by the browser 31 of Bob's terminal 30 in parallel with the steps G10 and G20, for example, or at some other moment prior to receiving the call request coming from Alice.

Bob's browser 31 responds to Alice's call request by sending its authorization code CODB together with a digital fingerprint FPB of a public key PKB that has been allocated to him by his browser 31 (step G70). As mentioned above for Alice, this public key PKB belongs to a pair of asymmetric keys (i.e. comprising the public key PKB and an associated private key SKB), allocated by the browser 31 to Bob for the communication with Alice in order to set up secure peer-to-peer exchanges with Alice using the DTLS protocol.

The response of the browser 31 passes via the web server 50 and is routed thereby to Alice's browser 21 (step G80).

Bob's browser 31 then initiates setting up a secure communication channel (or secure media) with Alice's browser 21. Exchanges on this communications channel are made secure by using the datagram transport layer security (DTLS) protocol, which is itself known.

For this purpose, Bob's browser 31 sends to Alice's browser 21 its own public key PKB (step G90) via its module 34. The public key PKB constitutes a data item DB characteristic of Bob in the meaning of the invention, in the sense that it is allocated in unique manner to Bob (and in this example to his communication with Alice), and it thus identifies Bob in unambiguous manner.

The data DB characteristic of Bob (i.e. his public key PKB in this example) is obtained by the obtaining module 22 of Alice's browser 21.

Alice's browser 21 responds to Bob's browser 31 by sending its public key PKA (step G100) via its module 24. This public key PKA constitutes a data item DA characteristic of Alice (and in this example of her communication with Bob) and thus identifies her in unambiguous manner.

The data item DA characteristic of Alice (i.e. her public key PKA in this example) is obtained by the obtaining module 32 of Bob's browser 31.

Thereafter, Alice's browser 21 verifies that the public key PKB is valid on the basis of the fingerprint FBP obtained in step G80, and where appropriate stores it in the non-volatile memory MEM of the terminal 20 (step G110). In parallel, Bob's browser 31 verifies the validity of the public key PKA by using the fingerprint FPA received in step G40, and where appropriate stores it in the non-volatile memory MEM of the terminal 30 (step G120). The steps G110 and G120 are performed in known manner to the person skilled in the art.

By means of this module 23, Alice's browser 21 then communicates with its identity provider 40/Alice (i.e. with the trusted entity 40), in order to associate (i.e. register) in the trusted entity an identity IDA for Alice together with the data item DB=PKB characteristic of Bob (step G130). The identity IDA may be the same identity as that used by the browser 21 for authenticating itself during step G10, or it may be an identity that Alice has selected for use with Bob (in other words that may vary as a function of the correspondent with whom Alice is seeking to set up communication). It may in particular be an email address, a telephone number, etc.

Using its module 42, the identity provider 40/Alice registers the data item DB characteristic of Bob in association with Alice's identity IDA in its non-volatile memory MEM' (step G140). It confirms this registration with the browser 21 (step G150).

Likewise, Bob's browser 31 registers with the identity provider 40/Bob an identity IDB for Bob (optionally selected as a function of Alice) in association with the data item DA=PKA characteristic of Alice (steps G160-G180). The communication step G160, the registration step G170, and the confirmation step G180 are identical to the steps G130, G140, and G150 described above for Alice.

Thereafter, Bob's browser 31 uses its module 35 to sign the authorization code CODA received from Alice by using Bob's private key SKB and a predetermined signature algorithm (step G190). For this purpose, the module 35 acts in a manner that is conventional and not described herein.

Thereafter, the signature of the authorization code, written CODA(SKB) is sent by the module 35 of the browser 31 to the identity provider 40/Alice in a request seeking to obtain Alice's identity (step G200).

The signed authorization code, or in equivalent manner, the signature CODA(SKB) itself, constitutes proof that Bob holds data, namely the secret key SKB, that corresponds in unambiguous manner to the data item DB characteristic of Bob, in other words, in this example, the public key PKB. Specifically, only a signature generated by using Bob's secret key SKB can be verified by the identity provider 40/Alice using the public key PKB. The verification of the signature CODA(SKB) by the identity provider 40/Alice also enables it to retrieve the authorization code CODA that it has given to Alice during Alice's authentication in step G20. The identity provider can thus confirm that the authorization code was indeed delegated by Alice to an authorized user, namely the user for whom she requested registration of the characteristic data item DB=PKB during the step G130 in association with her identifier IDA.

Thus, on reception of the request from Bob's browser 31, the identity provider 40/Alice verifies that the signature CODA(SKB) of the authorization code CODA does indeed correspond to a characteristic data item registered in association with Alice's identity, specifically in this example Bob's data item DB=PKB (step G210).

Where appropriate, the identity provider 40/Alice uses its module 43 to make available the identity IDA associated in its non-volatile memory MEM' with the characteristic data item DB=PKB (step G220). This making available comprises the identity provider 40/Alice sending the identity IDA directly to Bob's browser 31 (and in particular to its module 36), i.e. without passing via the web server 50. It should be observed that the identity IDA may be encrypted by the identity provider 40/Alice using Bob's public key PKB prior to sending it to Bob or it may be sent over a secure channel (e.g. in compliance with the HTTPS protocol).

If this verification of the signature fails (no data is stored in association with Alice's identifier enabling the signature received from the browser 31 to be verified), then the identity provider 40/Alice rejects Bob's identity request and does not provide Alice's identity IDA to Bob.

The steps G230 of signing the authorization code CODB using Alice's secret key SKA, and G240 of using the module 25 of the browser 21 to send a request to the identity provider 40/Bob seeking to obtain Bob's identity and containing the signature CODB(SKA) of the authorization code CODB, and also the steps G250 of verifying the signature, and G260 of sending the identity IDB by the identity provider 40/Bob to the browser 31 of the terminal 30 are all performed in identical manner to the above-described steps G190, G200, G210, and G220.

Thus, at the end of the step G220 (respectively of the step G260), Alice's browser 21 (respectively Bob's browser 31) has available Alice's identity IDA (respectively Bob's identity IDB). Advantageously, these identities do not transit via the web server 50, but are sent directly to the browsers 21 and 31 via the secure channel previously set up after verifying that both of them hold proof that Alice and Bob have respectively delegated the authorization codes.

In this first implementation, the invention thus enables identities to be exchanged in secure manner between Alice and Bob in compliance with the requirements of the OAuth2.0 protocol.

Figure 6:
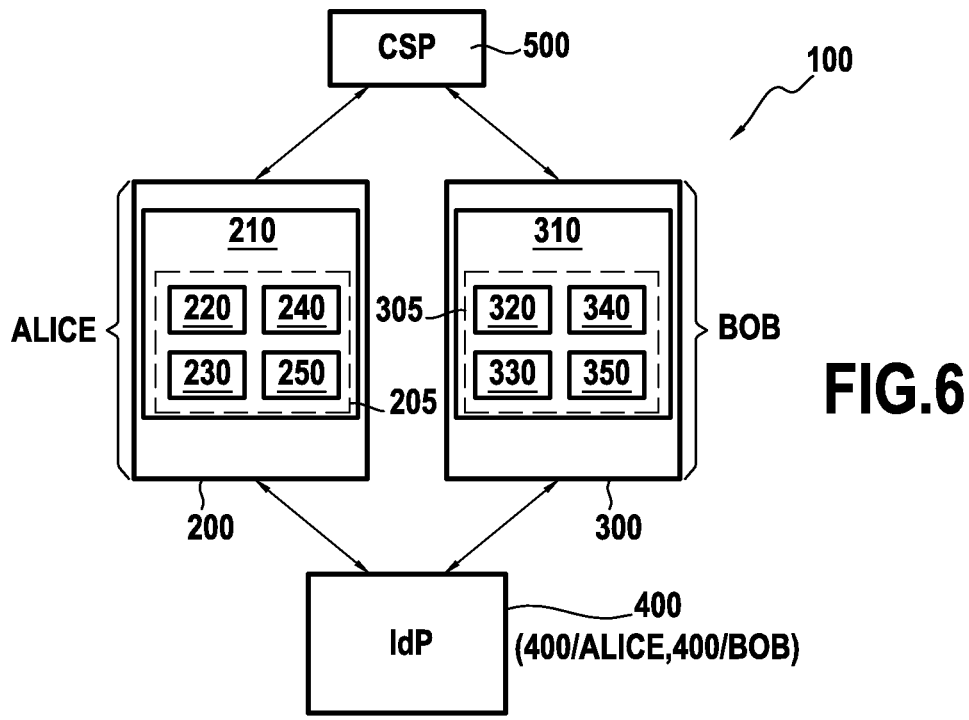
FIG. 6 shows a communications system in accordance with the invention in a second embodiment.
Figure 7:
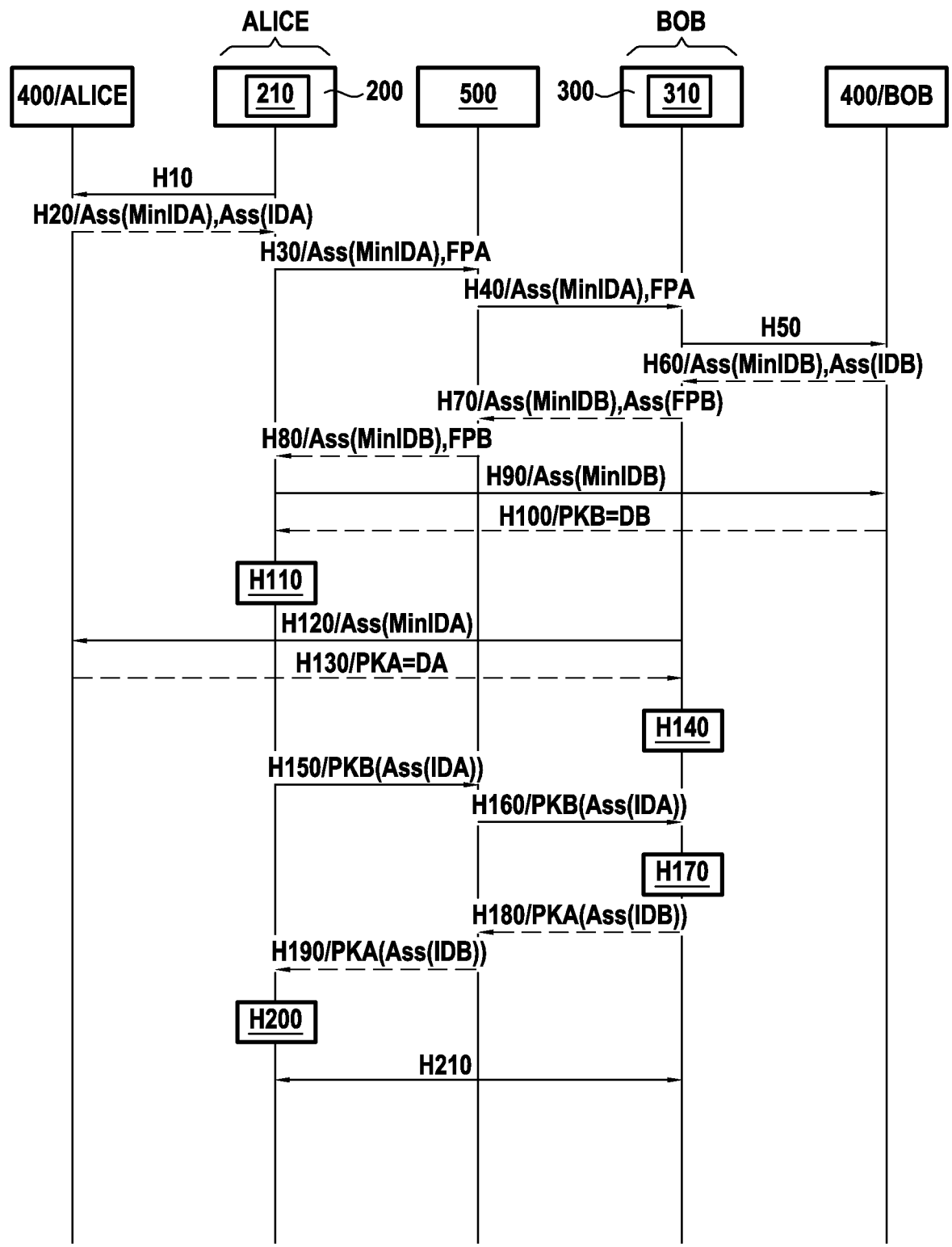
FIG. 7 shows the main steps of a management method of the invention as performed by the FIG. 6 communications system in the second embodiment.

There now follows a description with reference to FIGS. 6 and 7 of a second implementation of the invention in which identities can be exchanged in secure manner between Alice and Bob by using the invention when an SSO protocol with immediate identity provision is envisaged in a WebRTC context. In the presently-described example, this protocol is the BrowserID protocol.

FIG. 6 shows a second embodiment of a communications system 100 in accordance with the invention, in its environment.

In this second embodiment, the communications system 100 comprises:
  a terminal 200 of a first user (Alice), the terminal being in accordance with the invention and having installed thereon a web browser 210, the terminal 200 having a management system 205 in accordance with the invention;
  a terminal 300 of a second user (Bob) having a web browser 310 installed thereon;
  at least one trusted entity 400 suitable for authenticating the users Alice and Bob. By way of example, this trusted entity 400 is an identity provider. In order to simplify FIG. 6, only one trusted entity 400 is shown, which entity is common to both of the users Alice and Bob. Nevertheless, the invention applies equally when Alice and Bob make use of respective distinct trusted entities; and a web server 500 of a WebRTC communications provider (or CSP), to which the terminals 200 and 300 of Alice and Bob are connected via respective secure connections, e.g. connections established using the hypertext transfer protocol secure (HTTPS) protocol.

Like the web browsers 21 and 31 of FIG. 3, the browsers 210 and 310 have respective WebRTC programming interfaces or APIs, including a PeerConnection media object and suitable for instantiating an IdP proxy to interact and communicate with the trusted entity 400.

As in the first embodiment described above, it is assumed that each terminal 200 and 300 has the same means for making the identity of its own user available to the other user and for receiving the identity of the other user.

Like the terminals 20 and 30, the terminals 200 and 300 also have the hardware architecture of a computer as shown diagrammatically in FIG. 4A. Nevertheless, they differ from the terminals 20 and 30 in that the non-volatile memory MEM of each terminal now constitutes a recording medium in accordance with the invention that is readable by the processor PROC and that stores a computer program in accordance with the invention, including instructions for executing steps of a management method in accordance with the invention (referred to as program PROG4).

In equivalent manner, the computer program PROG4 defines functional modules of each of the terminals 200 and 300, and more precisely of the browsers 210 and 310, together with interactions between the modules, which modules are activated and controlled by the browsers 210 and 310 during communication in which the browsers are participating.

The functional modules defined by the computer program PROG4 in the second implementation include in particular for the terminal 200 (respectively for the terminal 300):

an obtaining module 220 (respectively 320) for obtaining at least one characteristic data item DB that is characteristic of Bob (respectively at least one characteristic data item DA that is characteristic of Alice);

an association module 230 (respectively 330) for associating an identity IDA of Alice (respectively an identity IDB of Bob) with the characteristic data DB (respectively DA);

a making-available module 240 (respectively 340) for making Alice's identity IDA (respectively Bob's identity IDB) available under certain conditions, as specified below; and an obtaining module 250 (respectively 350) for obtaining Bob's identity IDB (respectively Alice's identity) under certain conditions, likewise as specified below.

The functions of the functional modules 220-250 and 320-350 of the terminals 200 and 300 respectively are described below in greater detail with reference to FIG. 7.

FIG. 7 is a diagram showing the main steps of the management method of the invention in the second implementation, when performed by the communications system 100, and more precisely by the terminals 200 and 300, and when the system uses the BrowserID authentication protocol.

It is assumed that Alice seeks to set up communication with Bob via the browser 210 installed on her terminal 200 or more precisely communication with the browser 310 installed on Bob's terminal 300. Alice and Bob each perform in turn the role of the first user and the second user in the meaning of the invention.

For this purpose, the browser 210 sends beforehand a request to authenticate Alice to her identity provider 400/Alice (step H10). Alice is authenticated by the identity provider 400/Alice in conventional manner, as described in the WebRTC architecture and, in this example, relying on the BrowserID protocol.

In response to this authentication request, the browser 210 receives a certificate relating to a minimalist identity MinIDA for Alice that is written Ass(MinIDA), and a certificate relating to an identity IDA for Alice that is written Ass(IDA) (step H20).

In known manner, an identity certificate issued by a trusted entity comprises the identity in the clear together with a signature for that identity provided by the trusted entity. This constitutes proof of authentication by the trusted entity of the user using the identity.

The certificate Ass(MinIDA), or Ass(IDA), consequently constitutes proof that Alice has indeed been identified by the identity provider 400/Alice with the identity MinIDA, or IDA.

In this example, it should be observed that Alice's minimalist identity MinIDA constitutes information for providing Bob or Bob's identity provider with a minimal level of confidence about Alice (i.e. that she has been authenticated by the identity provider 400/Alice). This minimalist identity may be anonymized information, it may be constituted merely by one or more data fields, e.g., depending the intended context, comprising a code for a country of residence, a name of Alice's company, or even Alice's given name (only, i.e. without her family name).

In the second implementation described herein, the minimalist identity certificate Ass(MinIDA) also includes a link or other information making it possible to obtain from the identity provider 400/Alice a public key PKA belonging to a pair of asymmetric keys allocated to Alice. The pair of asymmetric keys also comprises a secret key SKA that is associated with the public key PKA.

The browser 210 sends the minimalist identity certificate Ass(MinIDA) together with a fingerprint FPA of Alice's public key PKA in a signaling message (call request) to Bob's browser 310 via the web server 500 (step H30).

The signaling message containing Alice's minimalist identity certificate Ass(MinIDA) and fingerprint FPA is routed by the web server 500 to Bob's browser 310 (step H40).

In the presently-described second implementation, on receiving the signaling message from Alice, the browser 310 in Bob's terminal 30 sends a request to authenticate Bob to his identity provider 400/Bob (step H50). In return, in compliance with the BrowserID protocol, it receives a certificate relating to a minimalist identity MinIDB for Bob that is written Ass(MinIDB), together with a certificate relating to an identity IDB for Bob that identifies him in unambiguous manner, and that is written Ass(IDB) (step H60). Each certificate relating to an identity (IDB or MinIDB) contains the identity and a signature of the identity by the identity provider 400/Bob.

In a variant, authentication protocols other than the BrowserID protocol could be used for the steps H10 and H50.

It should be observed that the steps H50 and H60 are not necessarily performed as a result of receiving the call request from Alice, but might be performed by the browser 310 of Bob's terminal 300 in parallel, e.g. with the steps H10 and H20, or at any other moment prior to receiving the call request coming from Alice.

Bob's browser 310 responds to Alice's call request by sending Bob's minimalist identity certificate Ass(MinIDB)

together with a fingerprint FPB of a public key PKB belonging to a pair of asymmetric keys uniquely allocated to Bob by his identity provider 400/Bob (step H70). This pair of asymmetric keys also comprises a secret key SKB associated with the public key PKB.

The reply from the browser 310 passes via the web server 500 and is routed thereby to Alice's browser 210 (step H80).

On receiving the reply from Bob, Alice's browser 210 uses its module 220 to send a request to Bob's identity provider 400/Bob in order to obtain Bob's public key PKB (step H90). For this purpose, its request includes the Bob's minimalist identity certificate Ass(MinIDB) as received in step H80.

On receiving the request, the identity provider 400/Bob extracts the minimalist identity MinIDB from the certificate Ass(MinIDB) and uses this minimalist identity in order to recover Bob's public key PKB.

As mentioned above, Bob's public key PKB as requested by Alice's browser 210 forms part of an asymmetric key pair previously allocated to Bob by the identity provider 400/Bob. It should be observed that this key pair may be different from the key pair allocated to Bob in order to communicate directly in secure manner with Alice using the DTLS protocol.

The public key PKB constitutes a data item DB characteristic of Bob in the meaning of the invention, in the sense that it is attributed in unique manner to Bob and identifies him in unambiguous manner.

It is sent by the identity provider 400/Bob to Alice's browser 210 (step H100).

The association module 230 of Alice's browser 210 associates the public key PKB (Bob's characteristic data item) received from the identity provider 400/Bob with Alice's identity IDA (or in equivalent manner with the corresponding certificate Ass(IDA)) in the memory MEM of the terminal 200 (step H110).

Thereafter, it encrypts Alice's identity IDA (more precisely its certificate Ass(IDA), which in this example contains the identity IDA) using Bob's public key PKB and a predefined encryption algorithm. Alice's identity certificate Ass(IDA) once encrypted using Bob's public key PKB is written PKB(Ass(IDA)).

In a variant, the module 230 encrypts only Alice's identity IDA instead of encrypting the certificate.

In similar manner, after receiving Alice's call request, Bob's browser 310 uses its module 320 to send a request to Alice's identity provider 400/Alice in order to obtain Alice's public key PKA (step H120). For this purpose, its request includes Alice's minimalist identity certificate Ass(MinIDA) as received in step H140.

On receiving the request, the identity provider 400/Alice extracts the minimalist identity MinIDA from the certificate Ass(MinIDA) and uses this minimalist identity to recover Alice's public key PKA.

As mentioned above, Alice's public key PKA requested by the browser 310 belongs to an asymmetric key pair previously allocated to Alice by the identity provider 400/Alice. It should be observed that this key pair may be different from the key pair allocated to Alice for communicating directly in secure manner with Bob using the DTLS protocol.

The public key PKA constitutes a data item DA characteristic of Alice in the meaning of the invention, in the sense that it is allocated to Alice in unique manner and identifies her in unambiguous manner.

It is sent by the identity provider 400/Alice to Bob's browser 310 (step H130).

The association module 330 of Bob's browser 310 then associates the public key PKA (data item characteristic of Alice) as received from the identity provider 400/Alice with Bob's identity IDB (or in equivalent manner with its certificate Ass(IDB)) in the memory MEM of the terminal 300 (step H140).

Thereafter it encrypts Bob's identity IDB (and more particularly, in this example, its certificate Ass(IDB), which contains the identity IDB), using Alice's public key PKA and a predefined encryption algorithm. Bob's identity certificate Ass(IDB) as encrypted using Alice's public key PKA is written PKA(Ass(IDB)).

In a variant, the module 330 encrypts only Bob's identity IDB rather than its certificate.

It should be observed that the steps H90-H110 and H120-H140 may be carried out in parallel by the respective browsers 210 and 310.

Alice's browser 210 then uses its module 240 to send a call request to Bob's browser 310, which request contains Alice's identity certificate Ass(IDA) encrypted with Bob's public key PKB, i.e. the message PKB(Ass(IDA)) (step H150).

This request passes via the web server 500, which routes it to Bob's browser 310 (step H160). Nevertheless, since the web server 500 does not hold Bob's private key SKB, it cannot access the certificate Ass(IDA) and it therefore cannot access the identity IDA contained in the request. Only Bob can access the identity IDA contained in the request by decrypting the message PKB(Ass(IDA)) using his secret key SKB.

In other words, the step of Alice's browser 210 sending the encrypted message PKB(Ass(IDA)) constitutes a step of making Alice's identity in the meaning of the invention available to Bob, on condition that Bob holds data (specifically the private key SKB) corresponding to the characteristic data item DB (i.e. the public key PKB) stored by the browser 210 in association with the identity IDA.

On receiving the call request from the browser 210, the browser 310 uses its module 350 to decrypt the message PKB(Ass(IDA)) by using Bob's secret key SKB, thereby obtaining Alice's identity IDA (step H170).

In response to Alice's call request, Bob's browser uses its module 340 to send the message PKA(Ass(IDB)) corresponding to Bob's identity certificate encrypted with Alice's public key (step H180).

This reply message passes via the web server 500, which routes it to the browser 210 of Alice's terminal 200 (step H190). Once more, the web server 500 does not have Alice's private key and therefore cannot access the certificate Ass (IDB) and therefore cannot access the identity IDB conveyed in the reply message.

On receiving the reply message, the browser 210 uses its module 250 to decrypt the encrypted message PKA(Ass (IDB)) by using Alice's secret key SKA, thereby obtaining Bob's identity IDB (step H200).

After this exchange of identities, a direct and secure communications channel is set up between the browsers 210 and 310 (step H210). This channel relies on the DTLS protocol.

It should be observed that the exchange of identities IDA and IDB between the users Alice and Bob could alternatively take place while the secure channel has already been set up between those users.

This second implementation thus provides a secure mechanism for exchanging Alice's and Bob's identities that is compatible with using an SSO protocol with immediate identity provision, such as the BrowserID protocol.

In both implementations described above, Alice's (respectively Bob's) identity is associated in the trusted entity 40 or in Alice's (respectively Bob's) browser with data characteristic of Bob (respectively Alice), such as a public encryption key. In a variant implementation, Alice's (respectively Bob's) identity may also be associated, in addition to being associated with the data item characteristic of Bob (respectively of Alice), with an identifier of the communication between Alice and Bob and/or with any other parameter associated with this communication. As a result, making Alice's (respectively Bob's) identity available may also be dependent on providing the identifier of the communication, thereby further strengthening the security of the mechanism for exchanging identities between Alice and Bob.

The invention claimed is:

1. A management method for managing an identity of a first user, the method for use during communication between a first web browser installed on a communication terminal of the first user and a second web browser installed on a communication terminal of a second user, the management method comprising:
    obtaining by the first user at least one first data item characteristic of the second user, the at least one first data item characteristic of the second user being a public key of a public and secret key pair allocated to the second user, the public key being obtained by the first browser from the second browser;
    associating an identity of the first user with the at least one first data item characteristic of the second user, the associating comprising registering, in at least one of the first web browser or a trusted entity for identifying the first user, the identity of the first user in association with the at least one first data item characteristic of the second user; and
    making the identity of the first user registered in the at least one of the first web browser or the trusted entity for identifying the first user in association with the at least one first data item available to the second user on condition that the second user holds at least one second data item of the second user corresponding to the first data item characteristic of the second user, the associating and making-available performed by a trusted entity for authenticating the first user, the making available comprising the trusted entity sending the identity of the first user to the second browser.

2. A management method according to claim 1, further comprising associating the identity of the first user with an identifier of the communication.

3. A management method according to claim 1, wherein the identity of the first user that is made available to the second user depends on the second user.

4. A management method according to claim 1, wherein the at least one first data item characteristic of the second user is a public key of a public and secret key pair allocated to the second user.

5. A management method according to claim 1, wherein the making-available comprises the trusted entity sending the identity of the first user to the second browser after the trusted entity has received proof of authentication of the first user signed by the second browser using the private key of the key pair allocated to the second user.

6. A management method according to claim 1, wherein the obtaining, associating, and making-available are performed by the first browser.

7. A management method according to claim 6, wherein:
    the at least one first data item characteristic of the second user is a public key of a public and secret key pair allocated to the second user, the public key being obtained by the first browser from a trusted entity that has authenticated the second user;
    the associating comprises the first browser encrypting the identity of the first user while using the public key of the second user; and
    the making-available comprises the first browser sending the encrypted identity to the second browser.

8. A method performed by a first web browser installed on a communication terminal of a first user, the method comprising:
    obtaining at least one first data item characteristic of a second user from a second web browser installed on a communication terminal of the second user, the at least one first data item characteristic of the second user being a public key of a public and secret key pair allocated to the second user; and
    communicating with a trusted entity for identifying the first user to associate, in the trusted entity, an identity of the first user with the at least one data item characteristic of the second user, the associating comprising registering in the trusted entity the identity of the first user in association with the at least one first data item characteristic of the second user to allow the trusted entity to send the identity of the first user to the second browser upon confirmation that the second user holds at least one second data item of the second user corresponding to the first data item characteristic of the second user.

9. A method according to claim 8, wherein the identity of the first user associated in the trusted entity with the at least one first data item characteristic of the second user is distinct from an identity of the first user used during authentication of the first user by the trusted entity.

10. A method performed by a trusted entity during communication between a first web browser installed on a communication terminal of a first user and a second web browser installed on a communication terminal of a second user, the trusted entity for identifying the first user, the method comprising:
    associating an identity of the first user with at least one first data item characteristic of the second user, the at least one first data item characteristic of the second user being a public key of a public and secret key pair allocated to the second user, the public key being obtained by the first browser from the second browser, the associating comprising registering the identity of the first user in association with the at least one first data item characteristic of the second user; and
    after the trusted entity has received proof that the second user holds at least one second data item of the second user corresponding to the first data item characteristic of the second user, making available to the second user the identity of the first user registered in association with the at least one first data item characteristic of the second user, the making available comprising the trusted entity sending the identity of the first user to the second browser.

11. A method for use during communication between a first web browser installed on a communication terminal of a first user and a second web browser installed on a communication terminal of a second user, the method performed by the second browser and comprising:
    providing the first browser with at least one first data item characteristic of the second user, the at least one first data item characteristic of the second user being a public key of a public and secret key pair allocated to the second user;

providing a trusted entity for authenticating the first user with proof that the second user holds at least one second data item of the second user corresponding to the first data item characteristic of the second user; and receiving an identity of the first user sent from the trusted entity to the second web browser, the identity of the first user being registered in the trusted entity with the first data item characteristic of the second user, the trusted entity for identifying the first user.

12. A system for managing an identity of a first user, during communication between a first web browser installed on a communication terminal of the first user and a second web browser installed on a communication terminal of a second user, the system configured to:

obtain, in the communication terminal of the first user, at least one first data item characteristic of the second user, the at least one first data item characteristic of the second user being a public key of a public and secret key pair allocated to the second user, the public key being obtained by the first browser from the second browser;

associate an identity of the first user with the at least one first data item characteristic of the second user, the associating comprising registering, in at least one of the first web browser or a trusted entity for identifying the first user, the identity of the first user in association with the at least one first data item characteristic of the second user; and make the identity of the first user registered in the at least one of the first web browser or the trusted entity for identifying the first user in association with the at least one first data item available to the second user on condition that the second user holds at least one second data item of the second user corresponding to the first data item characteristic of the second user, the association of the identity of the first user with the at least one first data item characteristic of the second user and the and the making the identity of the first user available to the second user performed by a trusted entity for authenticating the first user, the making the identity of the first user available to the second user comprising a trusted entity for authenticating the first user sending the identity of the first user to the second web browser.

13. A communication terminal having installed thereon a web browser including the system of claim 12.

14. A communication terminal of a first user having installed thereon a web browser the communication terminal configured to:

obtain at least one first data item characteristic of a second user from a second web browser installed on a communication terminal of the second user, the at least one first data item characteristic of the second user being a public key of a public and secret key pair allocated to the second user; and communicate with a trusted entity for authenticating the first user in order to associate an identity of the first user in the trusted entity with the at least one first data item characteristic of the second user, the association comprising registering in the trusted entity the identity of the first user in association with the at least one first data item characteristic of the second user to allow the trusted entity to send the identity of the first user to the second web browser upon confirmation that the second user holds at least one second data item of the second user corresponding to the first data item characteristic of the second user.

15. A trusted entity operable during communication between a first web browser installed on a communication terminal of a first user and a second web browser installed on a communication terminal of a second user, the trusted entity configured to:

associate an identity of the first user with at least one first data item characteristic of the second user, the at least one first data item characteristic of the second user being a public key of a public and secret key pair allocated to the second user, the association comprising registering the identity of the first user in association with the at least one first data item characteristic of the second user; and upon receiving proof that the second user holds at least one second data item of the second user corresponding to the first data item characteristic of the second user, making available to the second user the identity of the first user registered in association with the at least one first data item characteristic of the second user by sending the identity of the first user to the second browser.

16. A communication terminal associated with a first user and having installed thereon a first web browser, the communication terminal configured to:

provide by the first browser at least one first data item characteristic of the first user to a second browser installed on a communication terminal associated with a second user, the at least one first data item characteristic of the first user being a public key of a public and secret key pair allocated to the first user;

provide a trusted entity for authenticating the second user with proof that the first user holds at least one second data item of the first user corresponding to the first data item characteristic of the first user; and receive from the trusted entity an identity of the first user as registered in the trusted entity in association with the first data item characteristic of the second user, the identity sent to the first web browser by the trusted entity.

17. A communications system comprising:

the communication terminal of claim 16; and a communication terminal associated with a second user and having a second web browser installed thereon configured to associate an identity of the second user with at least one first data item characteristic of the first user, the associating comprising registering, in at least one of the first web browser or a trusted entity for identifying the first user, the identity of the first user in association with the at least one first data item characteristic of the second user.

* * * * *